J. G. CLEMENS.
ELECTRIC SOLDERING IRON.
APPLICATION FILED NOV. 21, 1914.
1,142,306.
Patented June 8, 1915.
2 SHEETS—SHEET 1.
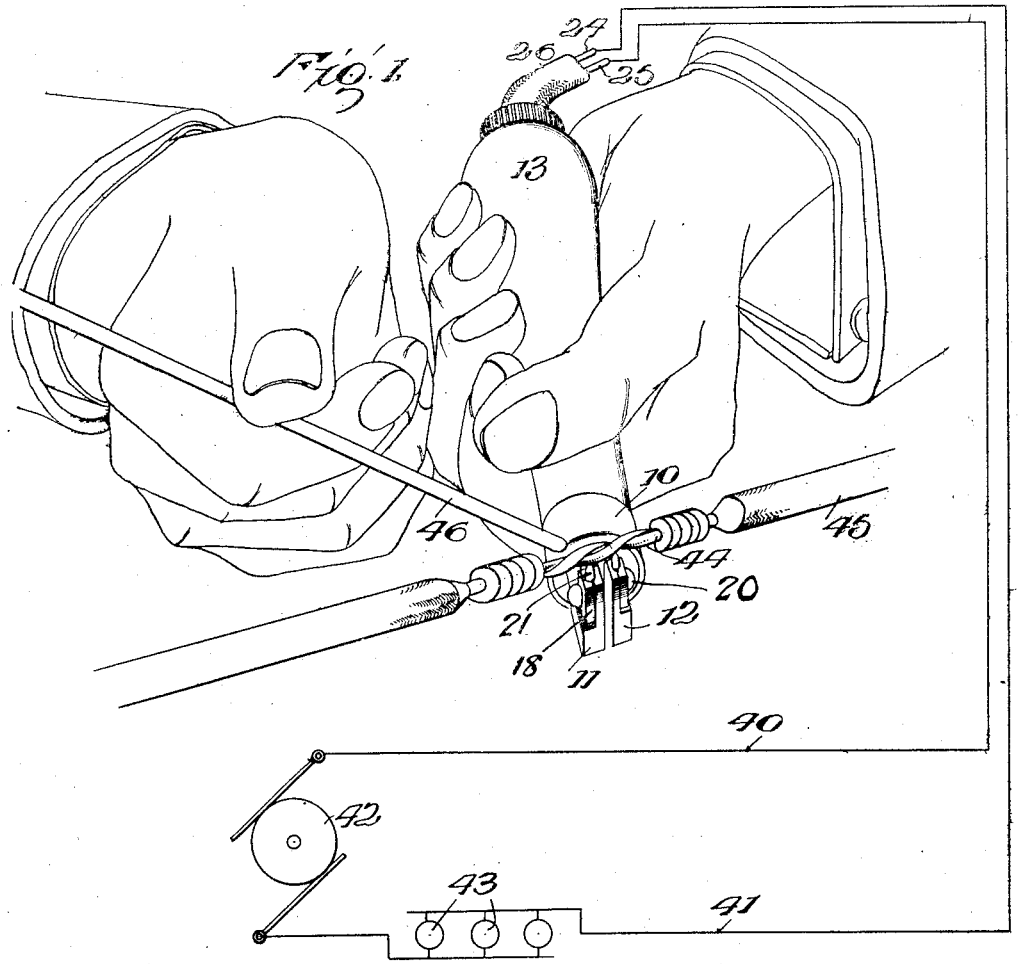
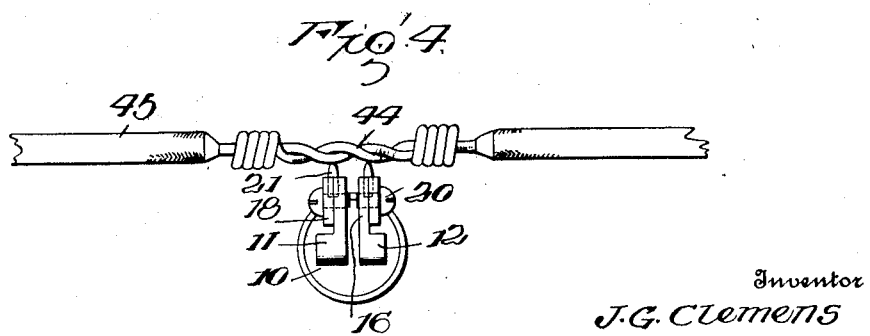
Witnesses
W. N. Woodson.
W. H. Woodman.
Inventor
J. G. Clemens
By
Attorneys

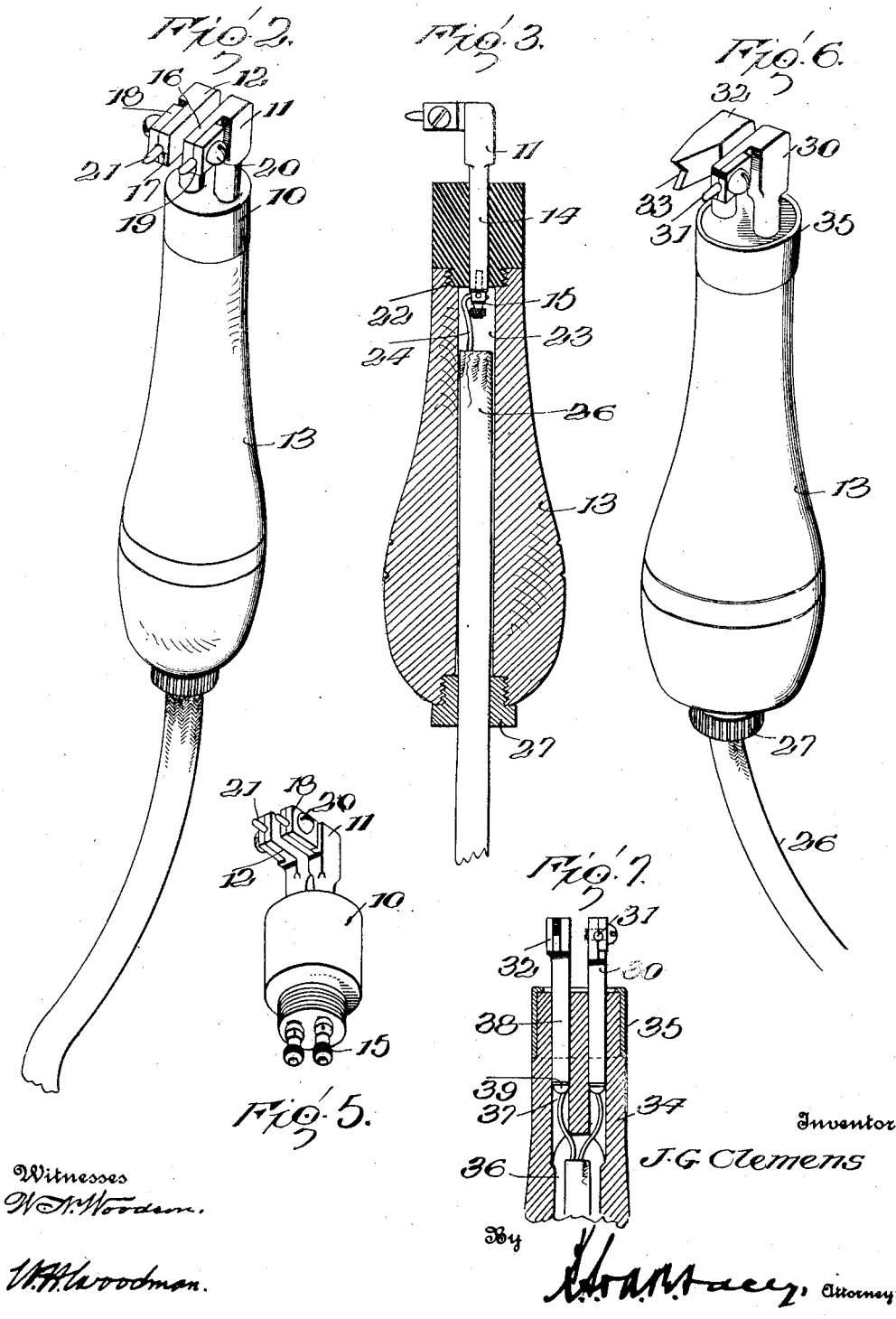

UNITED STATES PATENT OFFICE.

JOHN G. CLEMENS, OF BUFFALO, NEW YORK.

ELECTRIC SOLDERING-IRON.

1,142,306.  Specification of Letters Patent.  Patented June 8, 1915.

Application filed November 21, 1914. Serial No. 873,347.

*To all whom it may concern:*

Be it known that I, JOHN G. CLEMENS, a citizen of the United States, residing at Buffalo, in the county of Erie and State of New York, have invented certain new and useful Improvements in Electric Soldering-Irons, of which the following is a specification.

My invention relates to new and useful improvements in metal working tools, the primary object of my invention being the provision of an electrically heated soldering iron which will be simple and cheap in construction and efficient and economical in operation.

A further object of my invention consists in the provision of a soldering iron in which the heat developed is developed directly at the point of contact of the iron with the metal work being soldered, thereby avoiding all waste of energy, due to loss of heat through conduction or radiation.

A still further object of my invention consists in providing a soldering iron which, while not dependent upon the formation of an electric arc, is nevertheless dependent upon the passage of current from one heating terminal, through the metal work being soldered, to another heating terminal. Because of this construction, I accomplish a yet further object which consists in providing a soldering iron of the electrically heated type in which the flow of current will be automatically cut off upon removal of the soldering iron from the work being soldered. Because of this, all waste of current is avoided.

More specifically, my invention includes the provision of a soldering iron having spaced contact heads insulated from each other and adapted for connection in series in an electric circuit, one or both of the contact heads being provided with a contact proper of some high resistance material which will become highly heated upon passage of current. In this connection, a still further object of my present invention consists in the provision of means for detachably securing the contacts proper in the contact heads in order that they may be renewed in case of injury.

A still further object of my invention consists in the provision of a soldering iron in which the parts engaging the metal being soldered consist of some high resistance material, such as carborundum which, being included in a normally open energized circuit, will become highly heated when such circuit is closed, due to bringing the contacts proper in engagement with the metal being soldered.

A yet further object of my invention consists in the provision of a soldering iron in which the solder is applied directly to the metal pieces being soldered and not indirectly to such pieces by the iron itself, the solder, at no time, being brought into contact with the soldering iron.

With these and other objects in view, my invention will be more fully described, illustrated in the accompanying drawings and then specifically pointed out in the claims which are attached to and form a part of this application.

In the drawings: Figure 1 is a perspective view of the preferred embodiment of my electrically heated soldering iron in use, the energizing circuit for the iron being diagrammatically shown in the same figure; Fig. 2 is a perspective view of the soldering iron proper; Fig. 3 is a central, longitudinal sectional view taken between the contact heads; Fig. 4 is a front elevation of the tool in use; Fig. 5 is a detail perspective view of the tool head as a whole, the handle being removed to show certain details of construction; Fig. 6 is a perspective view of a somewhat modified form of soldering iron construction; Fig. 7 is a fragmentary, central longitudinal sectional view of the modified form of tool shown in Fig. 6, this section being taken at right angles to the section shown in Fig. 3 of the other form.

Corresponding and like parts are referred to in the following description and indicated in all the views of the drawings by the same reference characters.

Referring more specifically to Figs. 2 to 4 inclusive, as illustrative of the preferred form of my invention, it will be seen that the soldering iron consists primarily of a tool head 10 carrying spaced contact heads 11 and 12, the tool, in turn, being carried by a handle 13 of any suitable design and material. Preferably, the tool head 10 is formed of porcelain or some equivalent material, the shanks 14 of the contact heads 11 and 12 being embedded or otherwise secured in the tool head with their inner ends projecting slightly beyond the tool head and tapped to receive binding posts 15 or other suitable connections for the current supplying wires. The contact heads, together with their shanks, are preferably formed of some metal which will not scale at high temperatures, cast iron having been found very satisfactory for this reason.

The specific shape, size and proportions of the contact heads may be varied at will, each head, as shown in the present instance, including a laterally directed terminal 16 of reduced thickness having its outer face provided with a groove or channel 17 extending longitudinally of the terminal or at right angles to the shank of the contact head. Clamping plates 18 are provided upon their inner faces with co-acting grooves or channels 19 and are detachably secured against the outer faces of the terminals of the contact head by clamping screws 20. When so secured, the co-acting grooves of the contact heads and clamping plates are adapted to receive the contacts proper 21. These contacts are preferably formed of carborundum because of the high resistance which they offer to the passage of an electric current with the result that when an electric current is passed through them, they are almost instantaneously brought to a white heat. However, any other material which may be found suitable for the purpose may be employed.

As best shown in Figs. 3 and 5 of the drawings, the free end of the tool head proper 10 is preferably reduced somewhat and externally threaded to engage in an internally threaded socket 22 formed in one end of the handle. This handle may be formed of any suitable material, such as wood, and in any desired shape, being provided with a longitudinal bore or opening 23 which usually extends throughout its entire length. The current conducting wires 24 and 25, which are insulated from each other, being preferably provided in the form of a cable 26, are passed through this bore and secured by their uninsulated free ends to the binding posts 15 of the contact heads 11 and 12. An insulating sleeve or bushing 27 may be threaded into the free end of the tool handle to surround the current bearing cable 26 and prevent its chafing.

Although I have described each contact head as being provided with a contact proper of carborundum, it will be clear that this is not absolutely essential. For instance, in Figs. 6 and 7 of the drawings, I have illustrated a modified form of electrically heated soldering iron in which the contact head 30 is provided with a carborundum contact 31 adjustably secured in the manner previously described in connection with the preferred form of my invention and in which the other contact head 32 is merely formed with a notch 33. I have also illustrated a modified form of handle construction in connection with this modified form of soldering iron, the entire handle 34 being formed of wood with a metallic ferrule 35 about its outer end. This handle is provided throughout the greater portion of its length with a socket 36 and bores 37 are formed through the outer end of the handle to communicate at their inner ends with this socket. These bores are proportioned to snugly receive the shanks 38 of the contact heads and the shanks are provided with tapped bores in their free ends to receive the binding screws 39 by which the current conducting wires are connected.

In operation, the wires 24 and 25 are connected in any suitable manner to current carrying wires 40 and 41 leading from any suitable source of electrical energy, such as a dynamo 42. Under ordinary conditions, the wires 40 and 41 will be electric light wires, being readily available and, when such wires are used, it is best to insert a number of electric lights 43 in the circuit in series with the contacts of the tool in order to offer resistance to the current and so insure the proper voltage and amperage.

In Fig. 1 I illustrate the use of my improved soldering iron as applied to soldering the splice 44 of wires 45. As there shown, the two contacts are brought into engagement with the portions of wire to be soldered being engaged against the lower faces of such portions and the end of the stick or bar of solder 46 is brought against the portions of wire being soldered above the contacts. As soon as the contacts both engage the wires, the circuit is closed between them through the wires and the carborundum contacts proper consequently brought to a white heat. As these contacts proper are in direct and continuous engagement with the wires being soldered, during the entire soldering operation, it will be clear that this heat will be transmitted directly to such wires and the wires therefore sufficiently heated to permit ready flowing of the solder. Attention, at this point, is directed to the fact that this soldering iron does not depend and does not permit the formation of an electric arc and that the heating of the wires being soldered is not due, strictly speaking, to the passage of current through them, but to the passage of current through the carborundum points and the consequent heating of the wires being soldered by the heating of such points. It should be further noted that the circuit between the contact points proper of the soldering iron is automatically broken by removing such points from the work being soldered, and that for this reason, no current is supplied to the iron except when it is actually in use.

When the form of soldering tool, illustrated in Fig. 6, is employed in soldering wire joints, the wire seats in the notch 33 of one contact head which, therefore, assists in holding the tool against slipping from the work and insures a steady engagement between the contact 31 and the wire.

Having thus described the invention, what is claimed as new is:

1. A soldering tool including a handle, contact heads carried by the handle and insulated from each other, a contact proper of high resistance material in electrical engagement with one head, means for supplying current to one of the heads, and means for conducting current from the other head.

2. A soldering tool including a handle, contact heads carried by the handle and insulated from each other, a contact proper of carborundum in electrical engagement with one head, means for supplying current to one of the heads, and means for conducting current from the other head.

3. A soldering tool including a piece of carborundum, means for holding said piece of carborundum in engagement with the work to be operated upon, and means for supplying current to the carborundum and for conducting current from the work.

4. A soldering tool including spaced contact heads connected in series in a normally energized circuit, the circuit being broken between the contact heads, and a member formed of high resistance material carried by one of the heads and in electrical engagement therewith.

5. A soldering tool including spaced contact heads connected in series in a normally energized circuit, the circuit being broken between the contact heads, and a member formed of high resistance material carried by one of the heads and in electrical engagement therewith, said member being detachably secured to the head.

6. A soldering tool including spaced contact heads connected in series in a normally energized circuit, the circuit being broken between the contact heads, one of the contact heads being provided in its free face with a notch, and a member formed of high resistance material carried by the other contact head and in electrical engagement therewith.

7. A soldering tool including spaced contact heads connected in series in a normally energized circuit, the circuit being broken between the contact heads, one of the contact heads being provided with a groove, a clamping plate coacting with said contact head and provided with a corresponding groove, means for securing the plate to the head, and a contact element of high resistance material clamped in the co-acting grooves of the plate and head.

In testimony whereof I affix my signature in presence of two witnesses.

JOHN G. CLEMENS. [L. s.]

Witnesses:
JOSEPH NEESER, Jr.,
FRANK H. KAISER.